United States Patent
Fan

(10) Patent No.: US 9,074,290 B2
(45) Date of Patent: Jul. 7, 2015

(54) BIPOLAR ION EXCHANGE MEMBRANES FOR BATTERIES AND OTHER ELECTROCHEMICAL DEVICES

(75) Inventor: Qinbai Fan, Chicago, IL (US)

(73) Assignee: Gas Technology Institute, Des Plaines, IL (US)

( * ) Notice: Subject to any disclaimer, the term of this patent is extended or adjusted under 35 U.S.C. 154(b) by 240 days.

(21) Appl. No.: 13/562,371

(22) Filed: Jul. 31, 2012

(65) Prior Publication Data
US 2014/0038019 A1 Feb. 6, 2014

(51) Int. Cl.
| | | |
|---|---|---|
| H01M 8/10 | (2006.01) | |
| C25B 13/08 | (2006.01) | |
| H01M 4/94 | (2006.01) | |
| H01M 2/14 | (2006.01) | |
| H01M 2/16 | (2006.01) | |
| H01M 10/36 | (2010.01) | |
| H01M 12/08 | (2006.01) | |

(52) U.S. Cl.
CPC .................. *C25B 13/08* (2013.01); *H01M 4/94* (2013.01); *H01M 2/14* (2013.01); *H01M 2/1646* (2013.01); *H01M 2/16* (2013.01); *H01M 8/102* (2013.01); *H01M 2/164* (2013.01); *H01M 2/145* (2013.01); *H01M 2/166* (2013.01); *H01M 2/1686* (2013.01); *H01M 10/36* (2013.01); *H01M 10/365* (2013.01); *H01M 12/08* (2013.01); *H01M 12/085* (2013.01)

(58) Field of Classification Search
CPC ......... H01M 2/14; H01M 2/16; H01M 2/164; H01M 2/1646; H01M 8/102
USPC ................................................. 429/491, 492
See application file for complete search history.

(56) References Cited

U.S. PATENT DOCUMENTS

| | | | |
|---|---|---|---|
| 4,057,481 A * | 11/1977 | Lee et al. ....................... | 204/296 |
| 6,413,298 B1 | 7/2002 | Wnek et al. | |
| 6,893,763 B2 | 5/2005 | Fan et al. | |
| 7,115,333 B2 | 10/2006 | Fan et al. | |
| 7,323,265 B2 | 1/2008 | Fan et al. | |
| 7,903,390 B2 | 3/2011 | Fan | |
| 2007/0141456 A1* | 6/2007 | Wang et al. .................... | 429/144 |

FOREIGN PATENT DOCUMENTS

| | | |
|---|---|---|
| EP | 0 235 445 | 9/1987 |
| JP | 60-1234 | 1/1985 |

OTHER PUBLICATIONS

Wyllie et al. "Ion-Exchange Membranes. 11. Membrane Properties in Relation to Bi-Ionic Potentials in Monovalent Ion Systemsi", J. Phys. Chem., 1954, 58 (1), pp. 73-80.*
Xu, Tongwen, "Ion exchange membranes: State of their development and perspective", Journal of Membrane Science, 263 (2005) 1-29.
Lu, Shanfu et al., "Alkaline polymer electrolyte fuel cells completely free from noble metal catalysts", Proceedings of the National Academy of Sciences, vol. 105, No. 52, Dec. 30, 2008, 20611-20614.
Adams, Latifah A. et al., "A Carbon Dioxide Tolerant Aqueous-Electrolyte-Free Anion-Exchange Membrane Alkaline Fuel Cell", ChemSusChem, 2008 1, 79-81.
Varcoe, John R. et al., "Steady-State dc and Impedance Investigations of H-sub2/O-sub2 Alkaline Membrane Fuel Cells with Commercial Pt/C, Ag/C, and Au/C Cathodes", J. Phys. Chem B, vol. 110, No. 42, 2006, 21041-21049.
Varcoe, John R. et al., "An alkaline polymer electrochemical interface: a breakthrough in application of alkaline anion-exchange membranes in fuel cells", Chem. Commun., 2006, 1428-1429.
Xing, B. et al., "Hydrogen/oxygen polymer electrolyte membrane fuel cells (PEMFCs) based on alkaline-doped polybenzimidazole (PBI)", Electrochemistry Communications 2 (2000) 697-702.
Sollogoub, C. et al., "Formation and characterization of crosslinked membranes for alkaline fuel cells", Journal of Membrane Science 335 (2009) 37-42.
Leykin, Alexey Y. et al., "Ethanol crossover through alkali-doped polybenzimidazole membrane", Journal of Membrane Science 328 (2009) 86-89.
Hou, Hongying et al., "Alkali doped polybenzimidazole membrane for alkaline direct methanol fuel cell", International Journal of Hydrogen Energy, 33 (2008) 7172-7176.
Hou, Hongying et al., "Alkali doped polybenzimidazole membrane for high performance alkaline direct ethanol fuel cell", Journal of Power Sources 182 (2008) 95-99.
Modestov, A. D. et al., "MEA for alkaline direct ethanol fuel cell with alkali doped PBI membrane and non-platinum electrodes", Journal of Power Sources 188 (2009) 502-506.
Li, Y.S. et al., "Performance of alkaline electrolyte-membrane-based direct ethanol fuel cells", Journal of Power Sources 187 (2009) 387-392.
Fujiwara, Naoko et al., "Direct ethanol fuel cells using an anion exchange membrane" Journal of Power Sources 185 (2008) 621-626.
Matsuoka, Koji et al., "Alkaline direct alcohol fuel cells using an anion exchange membrane" Journal of Power Sources 150 (2005) 27-31.
Miyazaki, Kohei et al., "Perovskite-type oxides La-sub(1-x)Sr-sub(x)MnO-sub(3) for cathode catalysts in direct ethylene glycol alkaline fuel cells" Journal of Power Sources 178 (2008) 683-686.
Scott, K. et al., "Performance of a direct methanol alkaline membrane fuel cell" Journal of Power Sources 175 (2008) 452-457.
Database WPI, Week 198507, Thomson Scientific, London GB, XP002713097.

* cited by examiner

*Primary Examiner* — Ladan Mohaddes
(74) *Attorney, Agent, or Firm* — Pauley Petersen & Erickson

(57) ABSTRACT

A bipolar ion exchange membrane suitable for use in ZnBr batteries, LiBr batteries, and electrolyzers. The membrane is produced by hot pressing or extruding a mixture of an anion exchange ionomer powder, a cation exchange ionomer powder, and a non-porous polymer powder.

15 Claims, 2 Drawing Sheets

BIPOLAR ION EXCHANGE MEMBRANES FOR BATTERIES AND OTHER ELECTROCHEMICAL DEVICES

BACKGROUND OF THE INVENTION

1. Field of the Invention

This invention relates to electrochemical devices and components thereof. In one aspect, this invention relates to membranes for use in electrochemical devices. In another aspect, this invention relates to ion exchange membranes for use in electrochemical devices. In still another aspect, this invention relates to a method for producing ion exchange membranes.

2. Description of Related Art

Conventionally, depending upon the type of ionic groups attached to the membrane matrix, ion exchange membranes, also sometimes referred to as mosaic membranes, may be either cation exchange membranes in which cations are transported from one side of the membrane, through the membrane, to the opposite side and anions are rejected for transport through the membrane or anion exchange membranes in which anions are transported from one side of the membrane, through the membrane, to the opposite side and cations are rejected for transport through the membrane. Cation exchange membranes have negatively charged ionic groups, such as $—SO_3^-$, $—COO^-$, $—PO_3^{2-}$, fixed to the membrane backbone while anion exchange membranes have positively charged ionic groups, such as $—NH_3^+$, $—NRH_2^+$, $—NR_3^+$ fixed to the membrane backbone. Ion exchange membranes may be further categorized based upon the way in which the charged groups are connected to the membrane matrix or based upon their chemical structure. In particular, when the charged groups are chemically bonded to the membrane to the membrane matrix, they are referred to as being homogeneous, and when the charged groups are physically mixed with the membrane matrix, they are referred to as being heterogeneous. The majority of practical ion exchange membranes are homogeneous and composed of either hydrocarbon or fluorocarbon polymer films with which the ionic groups are attached.

In addition to polymeric ion exchange membranes, ion exchange membranes may also be prepared using inorganic materials, such as zeolites, betonite and phosphate salts. However, such membranes are expensive to produce and have several disadvantages including poor electrochemical properties and pores which are too large. Whereas such inorganic membranes are generally undesirable to use due to the aforementioned disadvantages, ion exchange membranes prepared from polymers into which inorganic components have been incorporated have been found to possess chemical stability and high conductivity. Such inorganic-organic (hybrid) ion exchange membranes may be prepared by a variety of methods including sol-gel processes, intercalation, blending, in situ polymerization, and molecular self-assembling.

Bipolar ion exchange membranes consist of at least a layered ion-exchange structure composed of a cation selective layer having negative fixed charges and an anion selective layer having positive fixed charges. These membranes may be used, for example, for separation of mono- and divalent ions, anti-deposition, Anti-fouling, and water dissociation applications.

Amphoteric ion exchange membranes contain both weak acidic (negative charge) groups and weak basic (positive charge) groups randomly distributed within a neutral polymer matrix. The sign of the charge groups in these membranes shows a pH response to an external solution.

In contrast to amphoteric membranes, a charge-mosaic ion exchange membrane has a set of anion exchange elements and cation exchange elements arranged in parallel which provide continuous ion transport pathways between bathing solutions on opposite sides of the membrane. A gradient of electrolyte concentration across the membrane results in parallel flow of anions and cations through their respective ion transport pathways, resulting in a circulation of current between individual ion-exchange elements. Due to the current circulation, charge-mosaic membranes show negative osmosis and salt permeability much greater than their permeability to non-electrolytes.

SUMMARY OF THE INVENTION

The apparatus of this invention comprises a bipolar, non-porous ion exchange membrane. The apparatus of this invention is an electrochemical device comprising a bipolar non-porous membrane having a positively charged surface and an opposite negatively charged surface and having a plurality of oppositely charged ion transport pathways extending through the membrane such that substantially all of the ion transport pathways are disposed substantially perpendicular to the charged surfaces. In contrast to conventional ion exchange membranes having substantially parallel oppositely charged ion transport pathways, the membranes of this invention are able to be used in ZnBr batteries, in LiBr batteries and in electrolyzers.

More particularly, conventional ion exchange membranes are typically produced using a liquid spray or soaking (impregnation) process employing acidic and basic liquid solutions and a porous substrate. Conventional ion exchange membranes produced using strong acids and bases are generally non-functional due to salt precipitation on at least one of the membrane surfaces. Conventional ion exchange membranes produced using weak acids and bases provide insufficient conductivity for the desired applications. In contrast thereto, the ion exchange membranes of this invention are non-porous membranes produced using solid acid and solid base powders in a process employing heat and extrusion or hot pressing.

In addition, the ion exchange membranes of this invention permit selected ion transport while blocking crossover of reactant molecules. For purposes of this invention, water and other solvent molecules are not considered to be reactant molecules. Important for electrolyzers, batteries, and capacitors, the membranes of this invention reduce unwanted ion and molecule crossover, both of which lower current efficiency of the electrochemical device. For example, in a zinc bromine flow battery, it is necessary for $Zn^{2+}$ and $Br^-$ (or $Br_3^-$ as well as other complexes) to transport through the membrane during charge and discharge cycles of the battery. However, if the product bromine at the cathode electrode also crosses over to the anode electrode, the result will be an internal chemical short. Thus, the membrane of this invention permits ion crossover while preventing molecular crossover, including complexed ions with reactant molecules. In addition, the ion exchange ionomers may become binders upon curing, making the membrane mechanically stronger.

BRIEF DESCRIPTION OF THE DRAWINGS

The objects and features of this invention will be better understood from the following detailed description taken in conjunction with the drawings, wherein.

DETAILED DESCRIPTION OF THE PRESENTLY PREFERRED EMBODIMENTS

The invention disclosed herein is an electrochemical device and membrane for use therein. The device comprises a bipolar non-porous membrane having a positively charged surface and an oppositely charged negative surface and having a plurality of oppositely charged ion transport pathways extending through the membrane. Substantially all of the ion transport pathways are disposed substantially perpendicular to the charged surfaces. The membrane further comprises a base polymeric material layer in which the oppositely charged ion transport pathways are formed by oppositely charged ion exchange ionomers comprising solid acid powders and solid base powders. In accordance with one embodiment of this invention, the base polymeric material layer is made of a base polymer selected from the group consisting of polyethylene, polypropylene, polyolefins, and combinations thereof. In accordance with one preferred embodiment, the base polymeric material layer is made of polyethylene.

Figure 1:
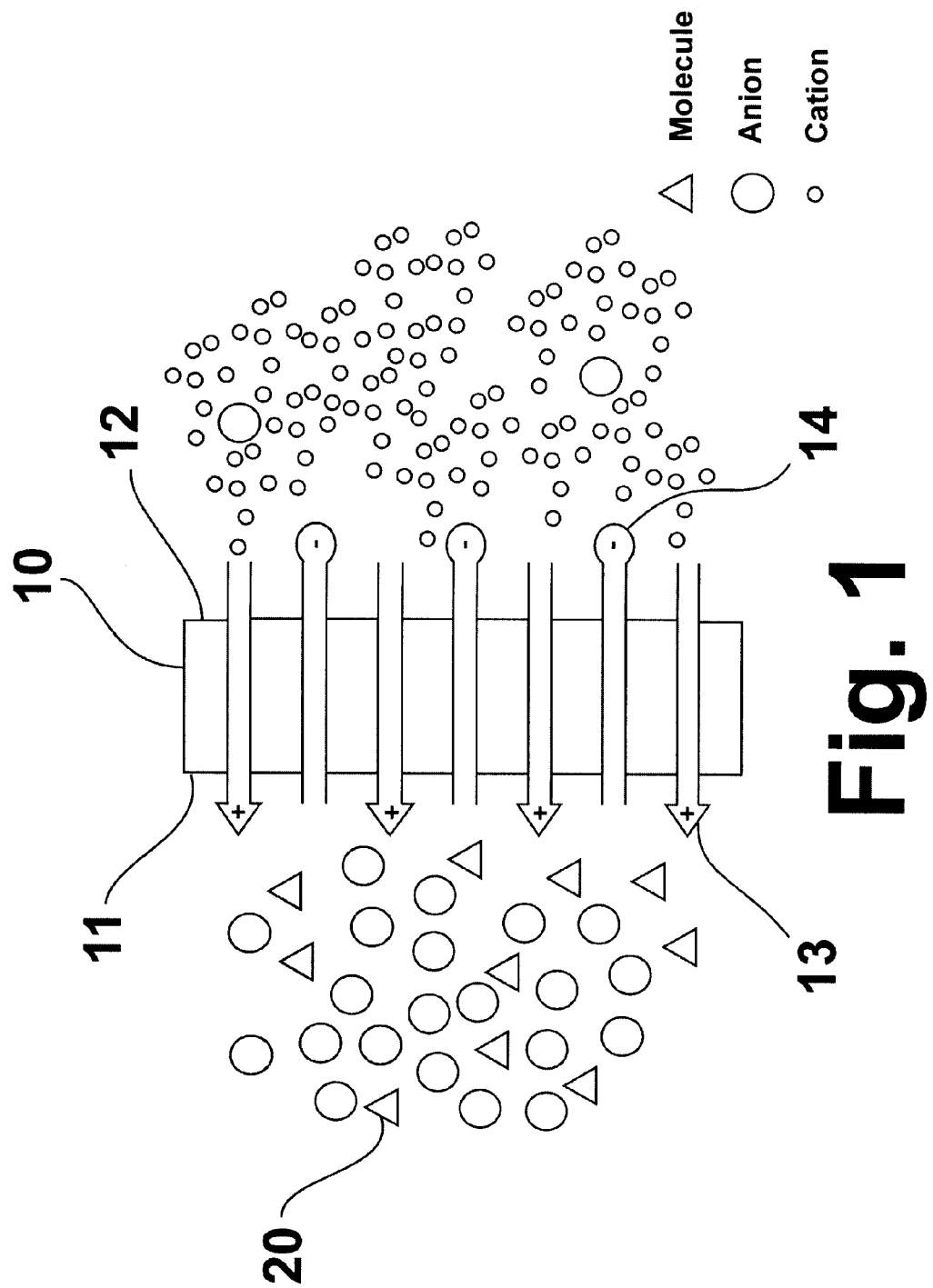
FIG. 1 is a schematic diagram of a bipolar ion exchange membrane in accordance with one embodiment of this invention.

FIG. 1 is a diagram showing a bipolar non-porous membrane in accordance with one embodiment of this invention. The membrane comprises a layer 10 having opposed sides 11, 12 and a plurality of positively charged ion transport pathways 13 formed by a cation exchange ionomer and a plurality of oppositely charged (negatively charged) ion transport pathways 14 formed by an anion exchange ionomer, substantially all of the ion transport pathways being oriented substantially perpendicular to the sides 11, 12 of the membrane 10. As used herein, the term "substantially all" as used to describe the amount of ion exchange pathways oriented substantially perpendicular to the sides of the membrane means at least about 80% of the ion transport pathways.

As previously indicated, conventional ion exchange membranes are primarily porous membranes, which are typically produced using a liquid spray or soaking (impregnation) process employing acidic and basic liquid solutions. While these conventional membranes may be suitable for use in one or two applications selected from the group consisting of ZnBr batteries, LiBr batteries, and electrolyzers, none of these membranes are suitable for use in all three applications as are the bipolar non-porous ion exchange membranes of this invention.

The two key elements of a process for producing ion exchange membranes in accordance with this invention are heat and material extrusion. In accordance with one embodiment, the membrane of this invention is produced by mixing the polymer used in the non-porous polymeric layer with a solid acid powder and a solid base powder, forming a membrane mixture. The membrane mixture is then extruded or hot pressed at an elevated temperature and an elevated pressure. As used herein the term "elevated temperature" refers to a temperature greater than the melting temperature of the base polymer powder and the term "elevated pressure" refers to a pressure greater than about 125 psi. In addition to being greater than the melting temperature of the base polymer powder, the extrusion or hot pressing temperature is less than the melting point of the solid salts of the acids and bases employed in the process.

EXAMPLE 1

In this example, the membrane in accordance with one embodiment of this invention was produced by drying a tertiary or quaternary amine (base) solution. The dried material, constituting the anion exchange ionomer, was cold ground into powder with dry ice. A NAFION® film, constituting the cation exchange ionomer, was also cold ground into powder using dry ice. A ground polyethylene powder, constituting the non-porous polymeric layer of this membrane, was sieved using a 50 mesh sieve. The sieved polyethylene powder was well mixed with 0.3 gm of polyethylene acrylic acid (PEAA) 200 mesh powder, which material is employed as a binder in the membrane, 0.15 gm of the tertiary or quaternary amine powder, and 0.15 gm of the NAFION powder. The resulting mixture was hot pressed between two layers of TEFLON® sheet in a hot press at a temperature of about 325° F. and an applied pressure of about 30,000 psi. The result was a 2.5 inch diameter round-shaped membrane having a thickness of about 0.008 inches. This membrane is suitable for use in flow battery and electrolyzer applications.

EXAMPLE 2

Figure 2:
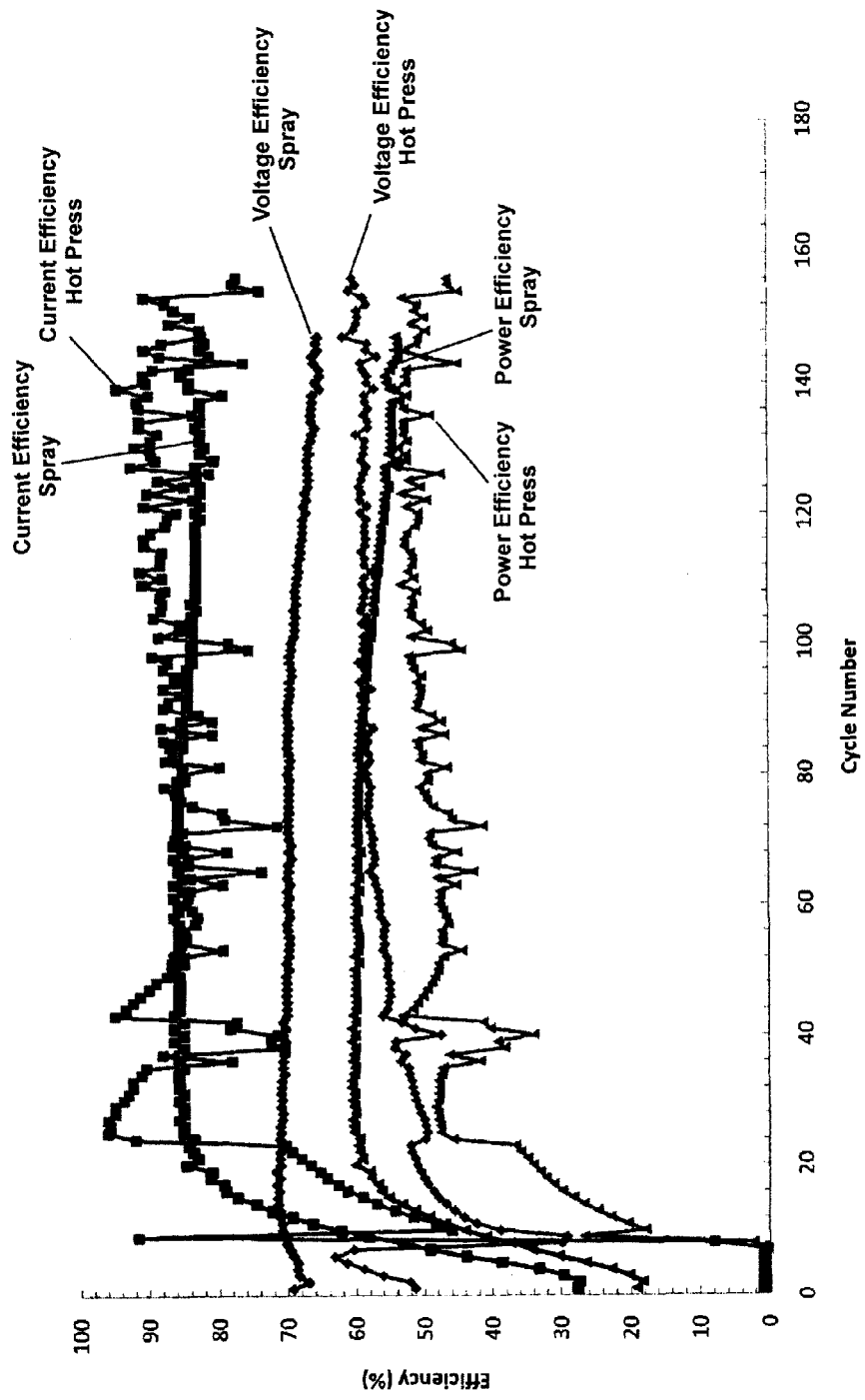
FIG. 2 is a diagram showing a comparison in the performance of a conventional ion exchange membrane and an ion exchange membrane in accordance with one embodiment of this invention.

In this example, an amine polymer (base) anion exchange resin, 28.3% by weight, was mixed with a cation exchange resin, NAFION, 29.5% by weight and a polyethylene resin, 42.4% by weight. The resulting mixture was extruded at a temperature of about 250° F. (polyethylene melting point is about 221° F.). FIG. 2 shows a performance comparison at 20 mA/cm$^2$ of this membrane with a conventionally produced membrane in a ZnBr battery. As is evident therein, the performance of the two membranes over time is comparable.

In accordance with one embodiment of this invention, the ion exchange membrane is hydrophilic. In accordance with this embodiment, at least one of the ion exchange ionomers or the non-porous polymeric layer is hydrophilic. In accordance with another embodiment of this invention, the membrane is hydrophobic. In accordance with this embodiment, at least one of the ion exchange ionomers or the non-porous polymeric layer is hydrophilic. Typically, the non-porous polymeric layer is hydrophobic and the ion exchange ionomers are hydrophilic. The hydrophobicity or hydrophilicity of the membrane may be varied by varying the ratio of hydrophobic material to hydrophilic material in the membrane. As the ratio of hydrophobic material to hydrophilic material in the membrane increases, the hydrophobicity of the membrane increases and the hydrophilicity of the membrane decreases. Likewise, as the ratio of hydrophobic material to hydrophilic material in the membrane decreases, the hydrophobicity of the membrane decreases and the hydrophilicity of the membrane increases. By virtue of this arrangement, the passage of water through the membrane may be controlled and even prevented as desired.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

What is claimed is:

1. An electrochemical device comprising: a bipolar non-porous membrane comprising a non-porous polymeric material having a positively charged surface and an opposite negatively charged surface and first and second oppositely charged ion exchange ionomers defining a plurality of oppositely charged ion transport pathways extending through said membrane, substantially all of said ion transport pathways disposed substantially perpendicular to said charged surfaces; wherein one of the first and second oppositely charged ion exchange ionomers is a solid acid powder and the other of the first and second oppositely charged ion exchange ionomers is a solid base powder.

2. The electrochemical device of claim 1, wherein said non-porous polymeric material layer is a polymer selected from the group consisting of polyethylene, polypropylene, polyolefins, and combinations thereof.

3. The electrochemical device of claim 2, wherein said bipolar non-porous membrane is produced by mixing said polymer, said solid acid powder, and said solid base powder, forming a membrane mixture, and extruding said membrane mixture at an elevated temperature and an elevated pressure.

4. The electrochemical device of claim 2, wherein said bipolar non-porous membrane is produced by spraying one side of said porous polymeric material layer with the solid acid and an opposite side of said non-porous polymeric material layer with the solid base, producing a membrane composition, and hot pressing said membrane composition, producing said membrane.

5. The electrochemical device of claim 1, wherein said oppositely charged ion exchange ionomers are binders.

6. The electrochemical device of claim 1, wherein said bipolar non-porous membrane is hydrophilic or hydrophobic.

7. The electrochemical device of claim 1, wherein said bipolar non-porous membrane is suitable for use in each of a ZnBr battery, a LiBr battery, and an electrolyzer.

8. The electrochemical device of claim 7, wherein said batteries are flow batteries.

9. A membrane for electrochemical devices comprising: a non-porous polymeric layer having a first surface and an opposite second surface; a cation exchange ionomer disposed within a first portion of said non- porous polymeric layer forming a plurality of cation transport pathways through said non- porous polymeric layer and a positively charged said first surface, substantially all of said cation transport pathways disposed substantially perpendicular to said surfaces; and an anion exchange ionomer disposed within a second portion of said non- porous polymeric layer forming a plurality of anion transport pathways through said non- porous polymeric layer interspersed between said cation exchange pathways and a negatively charged said second surface, substantially all of said anion exchange pathways disposed substantially parallel to said cation exchange pathways; wherein the cation exchange ionomer is a solid acid powder and the anion exchange ionomer is a solid base powder.

10. The membrane of claim 9, wherein at least one of said cation exchange ionomer, said anion exchange ionomer, and said non-porous polymeric layer is hydrophilic or hydrophobic.

11. The membrane of claim 9, wherein said membrane is suitable for use in each of a ZnBr battery, a LiBr battery, and an electrolyzer.

12. The membrane of claim 9, wherein said batteries are flow batteries.

13. The membrane of claim 9, wherein said membrane is produced by mixing a polymeric material, said solid acid powder, and said solid base powder, forming a membrane mixture, and extruding said membrane mixture at an elevated temperature and an elevated pressure.

14. The membrane of claim 9, wherein said membrane is produced by spraying one side of said non-porous polymeric layer with the solid acid and an opposite side of said non-porous polymeric layer with the solid base, producing a membrane composition, and hot pressing said membrane composition, producing said membrane.

15. The membrane of claim 9, wherein said non-porous polymeric layer is made of a polymer selected from the group consisting of polyethylene, polypropylene, polyolefins, and combinations thereof.

* * * * *